(12) United States Patent
Swingler et al.

(10) Patent No.: US 9,137,024 B2
(45) Date of Patent: Sep. 15, 2015

(54) SYSTEM AND METHOD FOR INCORPORATING AN ORIGINATING SITE INTO A SECURITY PROTOCOL FOR A DOWNLOADED PROGRAM OBJECT

(75) Inventors: Michael Alan Swingler, Palo Alto, CA (US); Thomas John O'Brien, San Jose, CA (US)

(73) Assignee: Apple, Cupertino, CA (US)

( * ) Notice: Subject to any disclaimer, the term of this patent is extended or adjusted under 35 U.S.C. 154(b) by 1143 days.

(21) Appl. No.: 12/821,656

(22) Filed: Jun. 23, 2010

(65) Prior Publication Data

US 2011/0320808 A1      Dec. 29, 2011

(51) Int. Cl.
| | |
|---|---|
| H04L 29/06 | (2006.01) |
| H04L 9/32 | (2006.01) |
| G06F 21/51 | (2013.01) |
| H04L 9/00 | (2006.01) |
| G06F 21/64 | (2013.01) |

(52) U.S. Cl.
CPC .............. *H04L 9/3265* (2013.01); *G06F 21/51* (2013.01); *H04L 9/007* (2013.01); *H04L 63/12* (2013.01); *H04L 63/126* (2013.01); *G06F 21/64* (2013.01); *H04L 63/123* (2013.01)

(58) Field of Classification Search
CPC .................. G06F 21/64; H04L 63/12–63/126
USPC ...................... 713/187–189; 723/1, 26, 27, 30
See application file for complete search history.

(56) References Cited

U.S. PATENT DOCUMENTS

| | | | |
|---|---|---|---|
| 6,044,466 A | 3/2000 | Anand et al. | |
| 6,366,912 B1 | 4/2002 | Wallent et al. | |
| 6,367,012 B1 * | 4/2002 | Atkinson et al. | 713/176 |
| 6,694,434 B1 * | 2/2004 | McGee et al. | 713/189 |
| 7,257,842 B2 * | 8/2007 | Barton et al. | 726/24 |
| 7,434,259 B2 * | 10/2008 | Hofmeister et al. | 726/22 |
| 7,606,821 B2 | 10/2009 | Leahy et al. | |
| 7,716,243 B2 * | 5/2010 | Schwartz et al. | 707/783 |
| 8,332,943 B2 * | 12/2012 | Sauve et al. | 726/23 |
| 2006/0143688 A1 | 6/2006 | Futoransky et al. | |
| 2006/0242712 A1 | 10/2006 | Linn et al. | |
| 2007/0118669 A1 | 5/2007 | Rand et al. | |
| 2009/0006600 A1 | 1/2009 | Siegmund | |
| 2010/0306816 A1 * | 12/2010 | McGrew et al. | 726/1 |

* cited by examiner

*Primary Examiner* — Evans Desrosiers
*Assistant Examiner* — Daniel Potratz
(74) *Attorney, Agent, or Firm* — Downey Brand LLP

(57) ABSTRACT

Disclosed herein are systems, methods, and non-transitory computer-readable storage media for verifying a digital object obtained from a remote host. A system configured to practice the method downloads a first object from a first remote source and presents the user with a first request to allow access to the first object. Upon user approval, a multitude of characteristics associated with the object are stored to facilitate future uses of the object. When a second object is downloaded from a second remote source, the system checks the database for a stored user approval. Access to the second object is allowed if the multitude of characteristics associated with the first and second objects match. If the system does not find a match, the user is presented with a second request to allow access to the object.

20 Claims, 10 Drawing Sheets

SYSTEM AND METHOD FOR INCORPORATING AN ORIGINATING SITE INTO A SECURITY PROTOCOL FOR A DOWNLOADED PROGRAM OBJECT

BACKGROUND

1. Technical Field

The present disclosure relates to object verification and more specifically to verifying the integrity of a digital object obtained from a remote host.

2. Introduction

As the Internet becomes an integral part of people's lives, more and more content on personal computers is obtained via Internet download. This is advantageous in that users are able to quickly and easily obtain access to a wide variety of content. However, it also leads to a plethora of potential security risks that deter many users from downloading legitimate content. For example, when a user downloads content from a website the user has to trust that the content will not harm their computer or improperly access data. In this scenario, many users will base their trust on the perceived origin of the content.

One approach to increasing a user's level of trust for an object obtained from a remote source is to include a digital certificate with the object. A digital certificate provides at least a minimal level of assurance due to the fact that a certification authority issues it and the user's system can authenticate it prior to accessing the object. However, even though the certificate is authenticated, the user must still make a decision as to whether they trust the certificate.

One method for conducting the verification is to present the user with a dialog box seeking permission to use the object. Such a dialog box presents information regarding the validity of the certificate. Additionally, the dialog box might contain an option to "always allow" a particular object. As long as nothing changes about the object, the user can reuse the object without encountering the dialog box again. When certain features of the object change, the user is once again presented with the dialog box to provide notification of the change and to verify that the object's use is permitted on the system. This method of verification fails when other aspects associated with the object change, potentially exposing computer users to security risks.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for verifying a digital object obtained from a remote host. Objects obtained from remote hosts pose significant risks for a number of reasons. For example, the objects are given access to data and resources on the local system, the remote host might not be trusted, or the user could have unintentionally navigated to a malicious site. To mitigate these and other risks, the local system should verify certain object characteristics prior to allowing the object to access the system. When the system is unable to verify the object, the known information should be presented to the user for the user to make the final determination.

A system configured to practice the method includes a module controlling a processor to download a first object from a first remote source and present the user with a first request to allow access to the first object. Upon user approval, the cryptographic identity and the remote source associated with the object are stored to facilitate future uses of the object. When a second object with a second cryptographic identity is downloaded from a second remote source, the system checks the database for a stored user approval. Access to the second object is automatically allowed if the first and the second objects match, the first and second cryptographic identities match, and the first and second remote hosts match. For two items to match they do not necessarily have to be identical. The system can be configured to specify an acceptable degree of similarity. If the two items are within a threshold degree of similarity then they are considered matching. If the system does not find a match, the user is presented with a request to allow access to the second object. Optionally, the system can include additional details explaining how the second object differs from one or more similar previously approved objects.

A system configured to practice the method is not limited to using the cryptographic identity and the remote host for object verification. In fact, any number of uniquely identifying properties associated with the object can be used. For example, the object identity can be defined by a tuple including the object's checksum, digital certificate, remote host, protocol, and port. In this case, the system will only find a match if all five of the characteristics match between the two objects. The security protocol is more sensitive when more characteristics are included in the tuple.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The present disclosure addresses the need in the art for improved verification of an object obtained from a remote host, such as a Java applet downloaded from a web server or a shareware application downloaded from a website. The disclosure first sets forth a discussion of a basic general purpose system or computing device in FIG. 1 that can be employed to practice the concepts disclosed here. The disclosure then turns to a brief introductory description with reference to FIG. 2, followed by a more detailed description of the exemplary method embodiments and sample graphical interfaces. Finally, the disclosure turns to an illustrative example of verifying objects on a local machine that were obtained from one or more remote sources.

Figure 1:
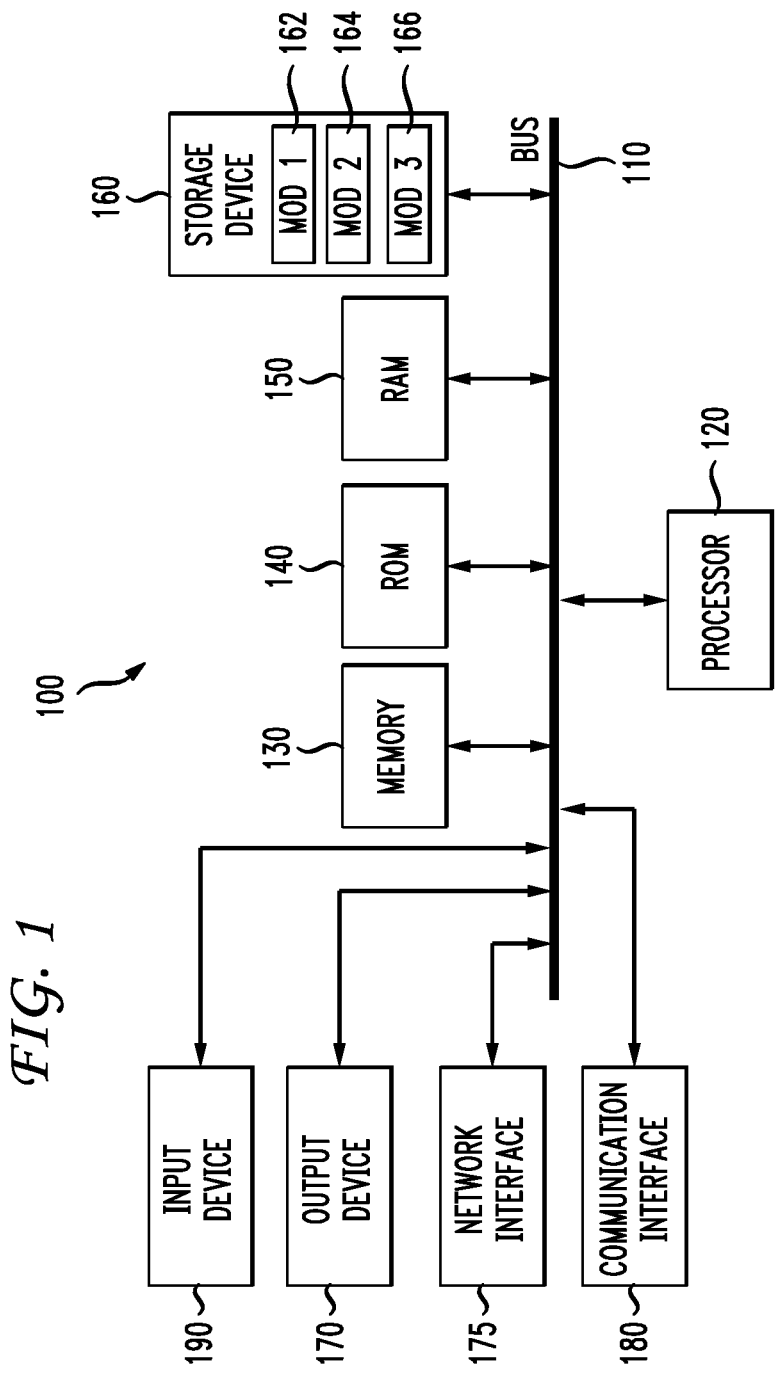
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. To enable communication with other systems and devices over a network, the computing device 100 further includes a network interface 175. The network interface 175 can provide for the transfer of information in and/or out of the computing device 100 using a cable or wireless signal containing a bit stream and the like. In some instances, multimodal systems enable a user to provide multiple types of input to communicate with the computing device 100. The communications interface 180 generally governs and manages the input and output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules controlling the processor 120 to perform particular steps or a series of steps. These modules may be stored on the storage device 160 and loaded into RAM 150 or memory 130 at runtime or may be stored as would be known in the art in other computer-readable memory locations.

Figure 2:
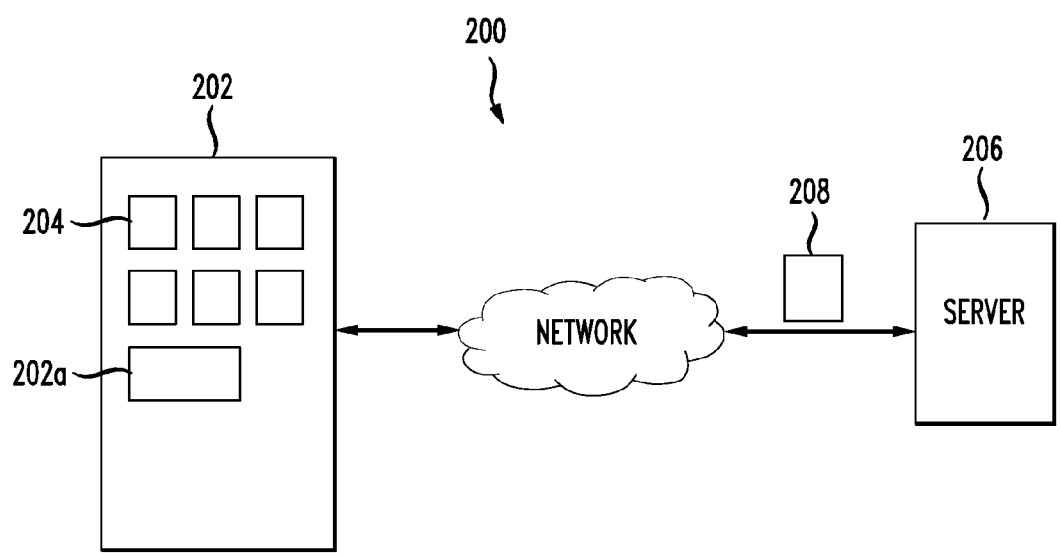
FIG. 2 illustrates an exemplary object access via a network.

Having disclosed some basic system components, the disclosure now turns to a brief introductory description of verifying an object obtained from a remote source with reference to FIG. 2. FIG. 2 depicts a general configuration of computers communicating over a network (200) in which a remote source 206 provides an object 208 to a computer 202. The object 208 can be any digital data transmitted from one computer to another such as an applet, an executable, a document, a video, a song, etc. In this example, a computer system 202 includes a built-in security mechanism 202a to protect users from potential security risks associated with accessing objects 204 obtained from a remote source 206. The computer system 202 can be a desktop computer, mobile computer, smartphone, and/or any other network-enabled computing device. One purpose of the security mechanism 202a is to ensure that any object that accesses system resources is actually authorized to do so by the user. To accomplish this task, the security mechanism 202a seeks user approval for each new object and stores the approval for later use so as to minimize the amount of interaction required by the user.

The security mechanism 202a is activated each time the user accesses an object on their system 202. The security mechanism 202a verifies whether the user had previously authorized the object. If the object is new to the system, then the security mechanism 202a presents a security dialog box to the user to obtain approval for the object. On the other hand, if the object was previously allowed, the security mechanism 202a further verifies that no changes have been made to the object itself or the associated digital certificate. Upon discovery that nothing has changed, access to the object is permitted. However, if a change is detected, the system again presents the security dialog box to the user to obtain approval for the changed object.

Figure 3:
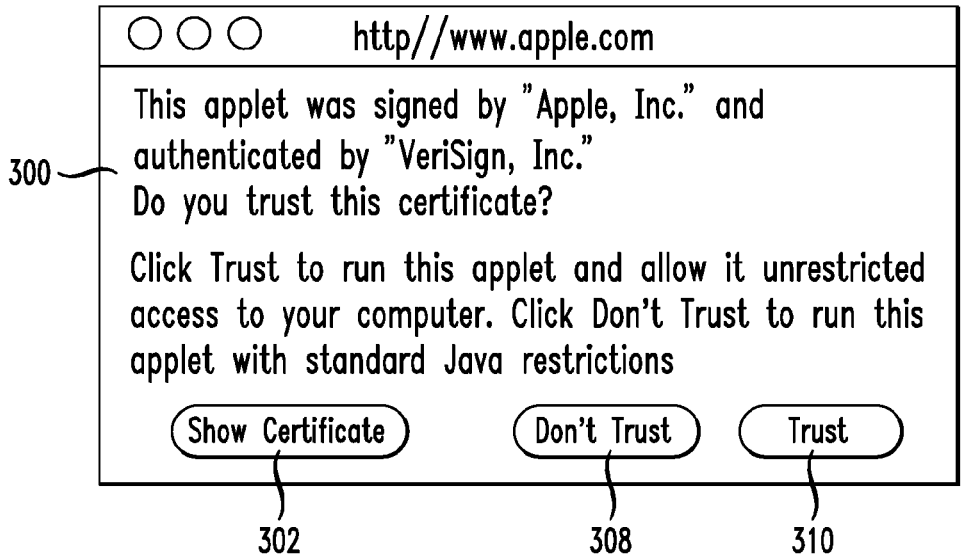
FIG. 3 illustrates a pair of sample prior art dialog boxes for obtaining user permission.
Figure 3:
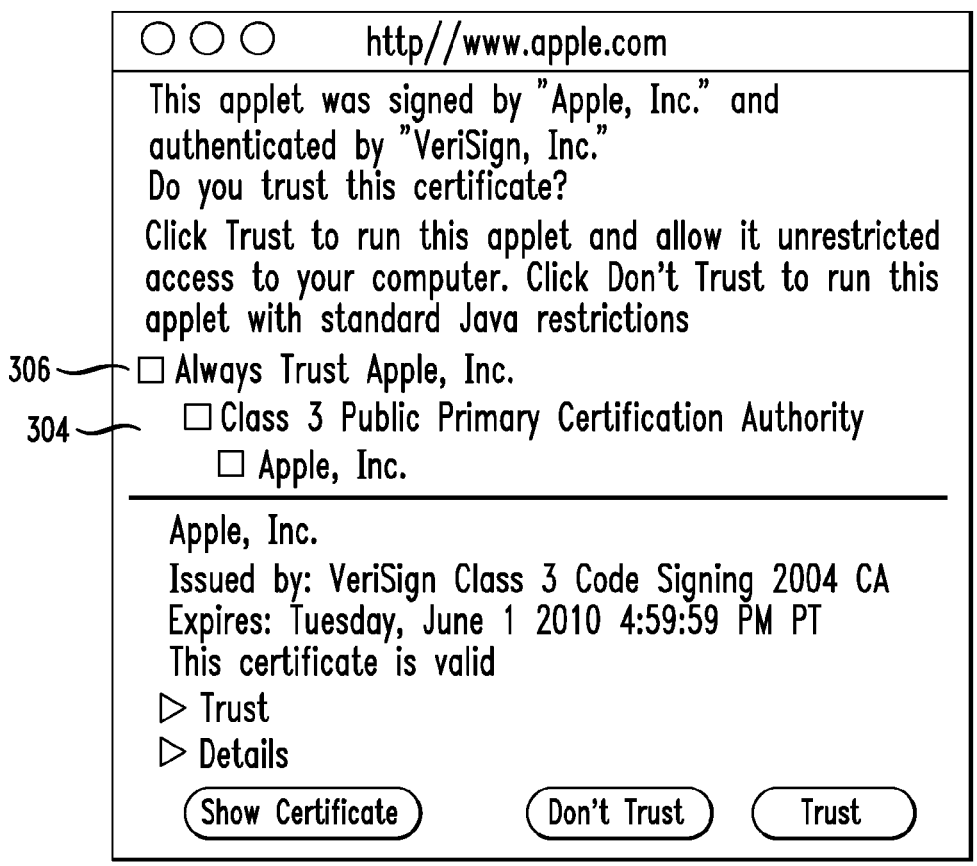

Object authorization generally occurs via a dialog box like the ones illustrated by the prior art in FIG. 3. The dialog box 300 is used to both report information to the user about the digital certificate and to request access. The "Show Certificate" button 302 allows the user to see the more detailed certificate information 304. Based on just the digital certificate information the user decides whether to allow the object. The user can deny the object by selecting the "Don't Trust" button 308 or confirm through the "Trust" button 310. Additionally, if the user wants to apply the decision to all future accesses of the object with the same digital certificate, the user can check the "Always trust" box 306. This method prevents some unauthorized accesses. However, because this verification approach is based strictly on the digital certificate, it fails to detect many other potential security risks. For example, objects containing the same digital certificate could reside on both a legitimate and a malicious host. If the user has previously allowed the digital certificate, this potentially malicious object will also be allowed. Further, under certain circumstances a digital certificate can be spoofed, duplicated, or forged.

The verification approach outlined herein addresses these drawbacks. When a user grants access to a new object and indicates the approval applies to all future accesses of the object, the system stores the approval with at least one other associated characteristic. These characteristics extend beyond the digital certificate to include features such as the identity of the remote host, the port used for communicating, the protocol used, which program requested the object, and so forth. The increase in stored information creates a finer grained comparison function, thus preventing a greater number of potential security risks. The number and type of characteristics stored and used for the comparison can vary based on a desired level of security. This approach verifies an object is the same as a previously approved object based on more data points than just the digital certificate. The number and types of characteristics discussed herein are exemplary. The system can use additional characteristics, attributes, and metadata which are instructive in determining whether two objects are the same.

Figure 4:
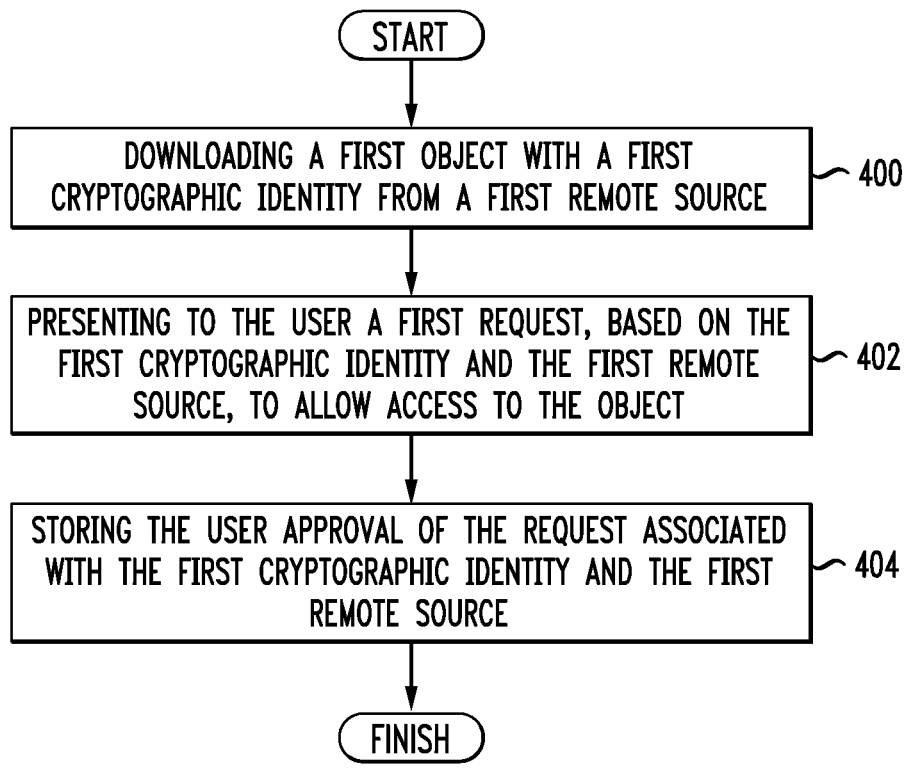
FIG. 4 illustrates a first example method embodiment.

Having disclosed some basic system components and concepts, the disclosure now turns to the exemplary method embodiment shown in FIG. 4. For the sake of clarity, the method is discussed in terms of an exemplary system such as is shown through the conjunction of FIG. 1 and FIG. 2 which are configured to practice the method. FIG. 4 illustrates an example method embodiment for storing user approval. A suitably configured system 100 can perform any and/or all the steps of the method. First, the system 100 downloads an object, for the first time, with an associated cryptographic identity from a remote host (400). Since the system 100 is unfamiliar with this object and the user has yet to grant access to the object, the system 100 presents to the user a first request to allow access to the object based on the associated cryptographic identity and remote source (402). The request to grant access can be triggered before, during, or after download, but it can also be triggered by other actions within the system such as when the user attempts to execute the object for the first time, or when the object attempts to access sensitive resources. The timing of the trigger can also vary depending on the object type.

Next the system 100 stores the user's approval of the request associated with the cryptographic identity and remote source (404). The system 100 stores the user's approval in any manner that permits access for future verification, such as in a database or in a separate file. For example, a commonly used storage method is to construct a table based on (key, value) pairs. In the present embodiment, the key is formed from the cryptographic identity and remote source. The approval value is stored at a location key in the table. At some later point, when the system 100 encounters the same cryptographic identity and same remote source, the system 100 will act according to the associated stored approval value. In one aspect, the system 100 stores the approval in such a way that the user or another program is unable to directly modify the stored approval. For example, the system 100 can encrypt the stored approvals using a hash input based on the object, remote source, port, and protocol.

Figure 5:
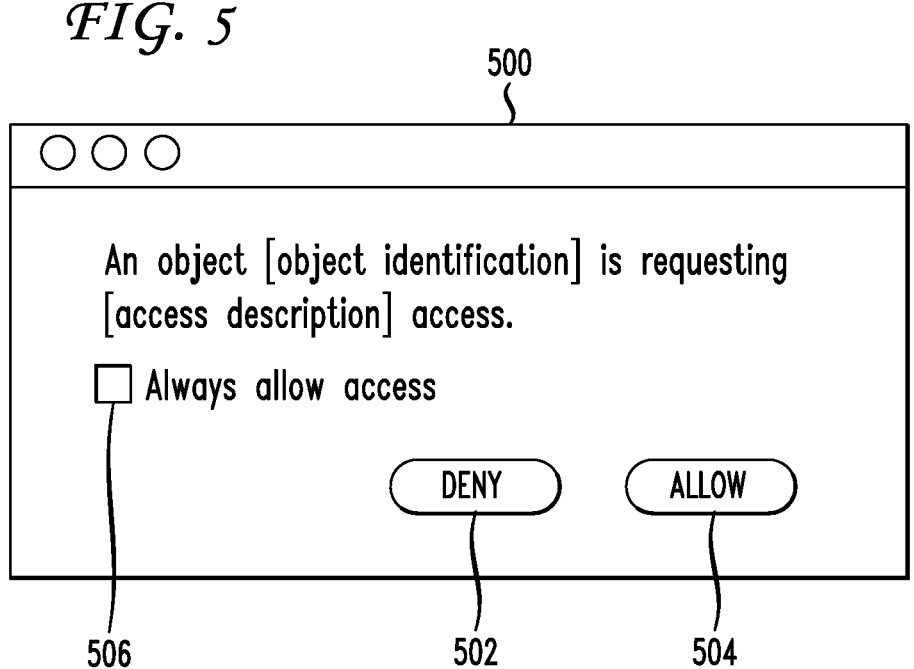
FIG. 5 illustrates an exemplary access request dialog box.

The request to grant access (402) can take the form of a dialog box such as that in FIG. 5 or any other technique of notifying the user and obtaining user feedback. Dialog box 500 requests the user to either deny or allow the object by clicking the "Deny" button 502 or the "Allow" button 504. In addition to granting access for that particular instance, the user can choose to allow all future accesses without requiring further approval. For example, dialog box 500 also includes check box 506, which, when checked, indicates all future accesses of the object should be permitted without seeking user approval. One aspect of the method includes varying levels of user approval granularity. The system 100 can also be configured so that the user can grant approval for a single access or for all accesses over a specified period of time, such as for one month, during a particular browser session, or until the approval is revoked. Once the specified time period has expired, the system 100 will again request approval for those objects. Other dialog boxes, menus, or options can provide a user interface to trust all objects accessed from a certain site, for example. Any of these approval types can be stored by the system 100 in association with the object's cryptographic identity and remote source.

As used herein, the terms "match" and "same" are defined to mean that two items exhibit an acceptable degree of similarity and thus do not necessarily have to be identical. For example, a stored host name might also match other hosts in the same domain. The https protocol is one example of a suitable substitute for the http protocol. Some fields in the digital certificate might be required to be identical, but others are more flexible. A similarity threshold can be determined based on a predefined list of acceptable alternatives, a pattern matching algorithm (such as a regular expression), address relationship (such as the approval of one subdomain of a website automatically approving other subdomains of the same website), and/or other approaches.

Figure 6:
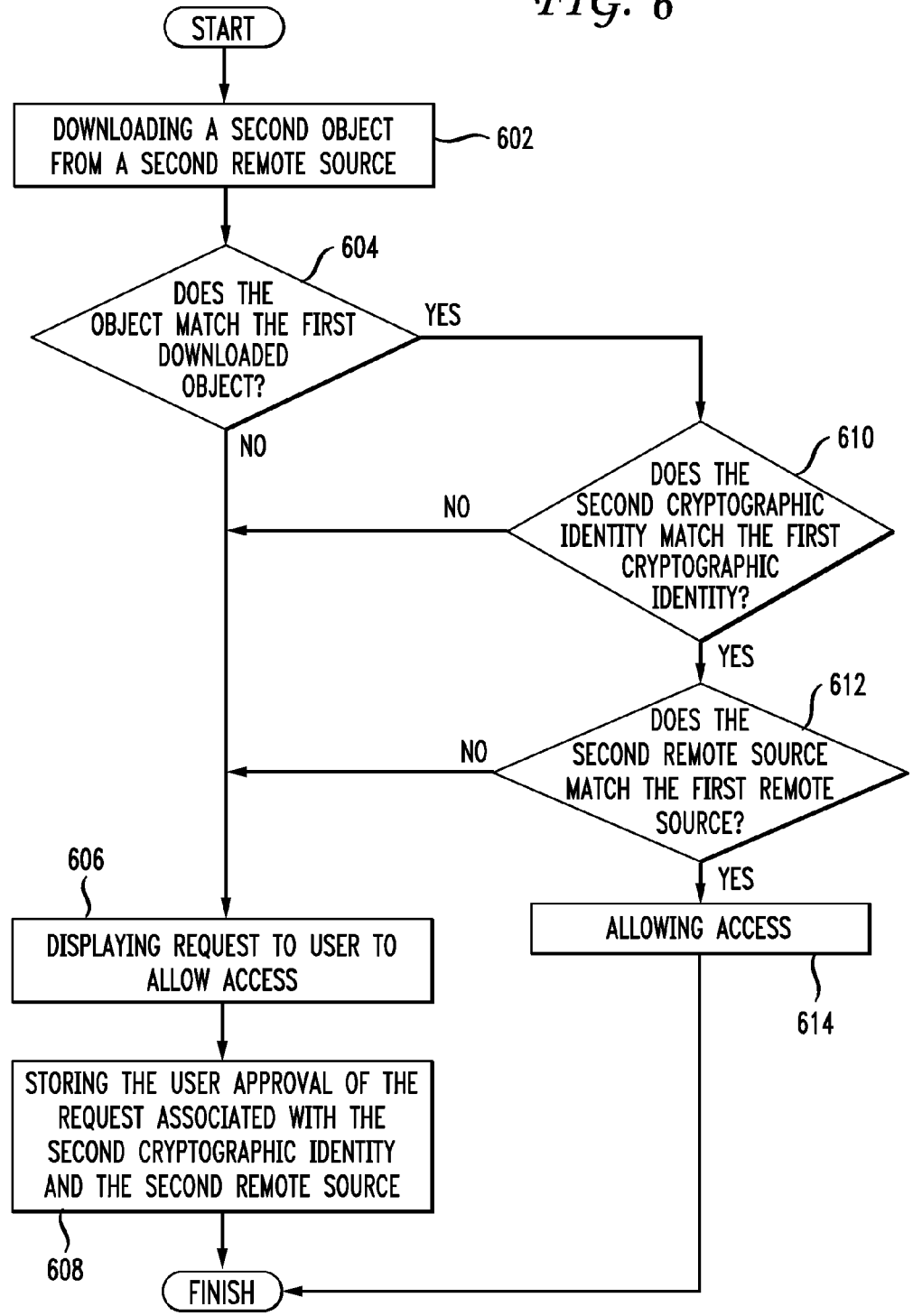
FIG. 6 illustrates a second, more detailed example method embodiment.

FIG. 6 illustrates a second, more detailed example method. A suitably configured system 100 can perform any and/or all the steps of the method via a processor. First, the system 100 downloads an object with an associated cryptographic identity from a remote host (602). The system 100 determines whether the second object matches a previously downloaded object (604). This check can be performed in a number of ways with the only limitation being that the identifier associated with the object must be unique, i.e. if the object, source, port, protocol, or other information changes the identifier must also change. For example, the system 100 could maintain a list of checksums for all known approved objects, thus if an updated version of the object is created, the checksums will differ. If the answer to query 604 is no, then flow continues to 606 where the system 100 presents to the user a request to allow access to the object based on the associated cryptographic identity and remote source. As in the previously discussed embodiment, the request to grant access can take the form of a dialog box such as that in FIG. 5 or any other technique of notifying the user and obtaining user feedback. The system 100 stores the user's approval of the request associated with the cryptographic identity and remote source (608). However, if the answer to query 604 is yes, because the system 100 has previously encountered this object, then flow proceeds to 610 where the system 100 checks if the cryptographic identity of the current object matches the cryptographic identity of the previously downloaded object. If the answer is no, then flow continues to 606. On the other hand, if the answer is yes, then flow continues to 612 where the system 100 checks if the remote source associated with the current object matches the remote source associated with the previously downloaded object. Once again, if the answer is no, then flow continues to 606 where the system 100 presents to the user a request to allow access (606) and stores the user's approval (608). If the answer to query 612 is yes, then the system 100 is sufficiently certain that the prior approval applies to the downloaded object and allows access (614) to the downloaded object.

In a further embodiment, the verification illustrated in FIG. 6 can be expanded to include object characteristics beyond the cryptographic identity and remote source. By expanding checks 610 and 612 to additionally check the network transmission protocol and/or port, an additional layer of security is added to the verification method. Some non-limiting examples of protocol include HTTP, XMPP, SSH, and LDAP. Some non-limiting examples of ports in TCP and UDP include, for example, port 21 for FTP data, port 80 for HTTP data, port 443 for HTTPS data, port 531 for AOL Instant Messenger data, port 1085 for WebObjects, and so forth. To accommodate the additional characteristics when storing user approval, instead of constructing the key as a pair, the key is constructed as a tuple of three or more objects, e.g. (cryptographic identity, remote source, protocol, port). Alternatively, the key can be constructed as a single value by concatenating the values. In one aspect, keys are constructed deterministically and uniquely such that the same input values yield the same, unique key.

In some embodiments, the remote source can be a local device like a USB keychain, transportable drive, or a database/storage unit that is accessed by means other than TCP over a network. For example, such access can occur via the bus 110 in FIG. 1. In the case of a non-network remote source, the unique object properties that can be used for verification include, but are not limited to, the volume name, the volume UUID, and the volume serial number.

Figure 7:
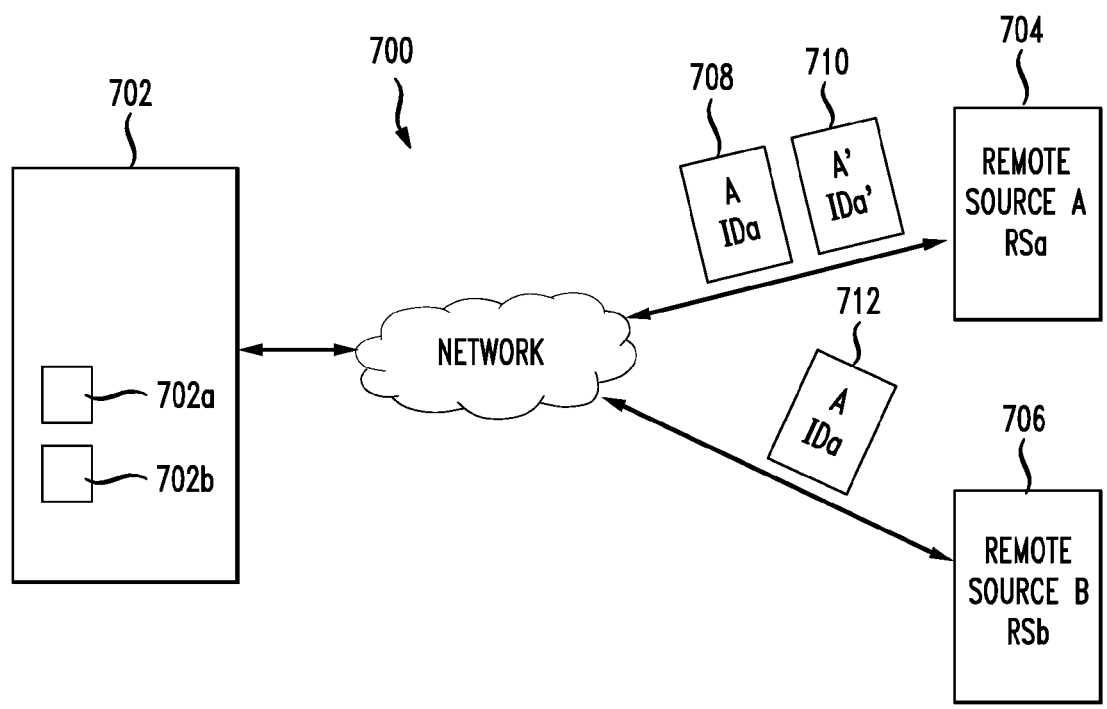
FIG. 7 illustrates an exemplary configuration of devices and a network.
Figure 8:
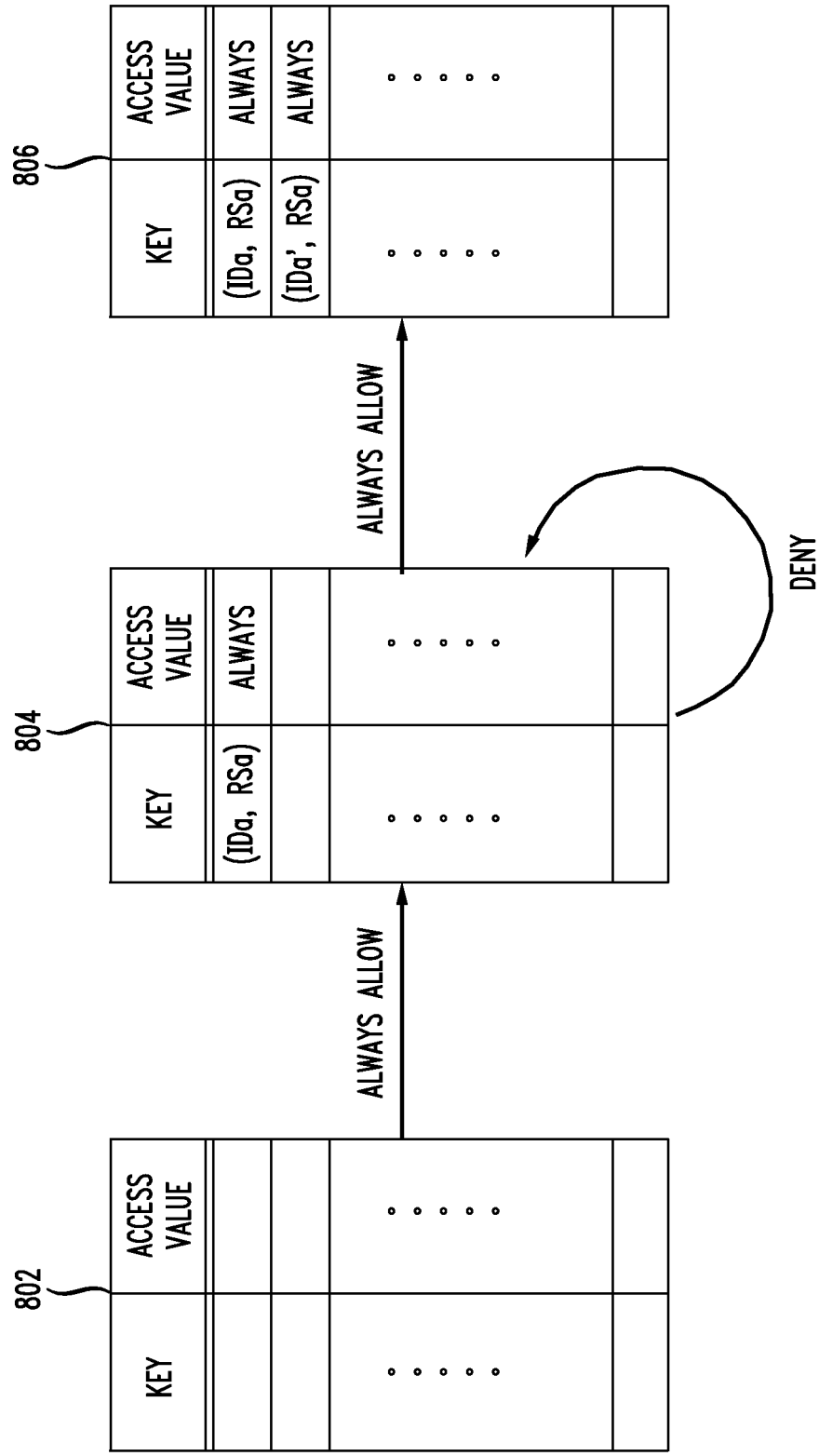
FIG. 8 illustrates an exemplary lookup table evolution.

The disclosure now turns to a specific illustrative example of verifying objects on a local machine that were obtained from one or more remote sources. FIG. 7 illustrates an exemplary configuration of devices and a network 700. The user is accessing a popular social networking website in order to post photos from a recent vacation. In order to post the photos the user's system 702 downloads an applet A with a cryptographic identity IDa 708 from the remote source 704, which has the identity RSa. When the system executes the applet 708, the applet 708 attempts to access the system's hard drive 702*a*. This access attempt triggers the system's access control mechanism 702*b*. Any object on the system 702 can trigger the security mechanism by requesting access to protected resources, attempting to execute certain instructions, or otherwise matching a template of enhanced risk. The system 702 first checks if the characteristics of the applet 708 match any that the user previously approved by checking its internal lookup table 802 in FIG. 8. To perform the lookup the system constructs a key using the applet's cryptographic identity and the identity of the remote source, i.e. key=(IDa, RSa). Lookup table 802 is currently empty indicating that the user has not granted access to applet 708.

Figure 9:
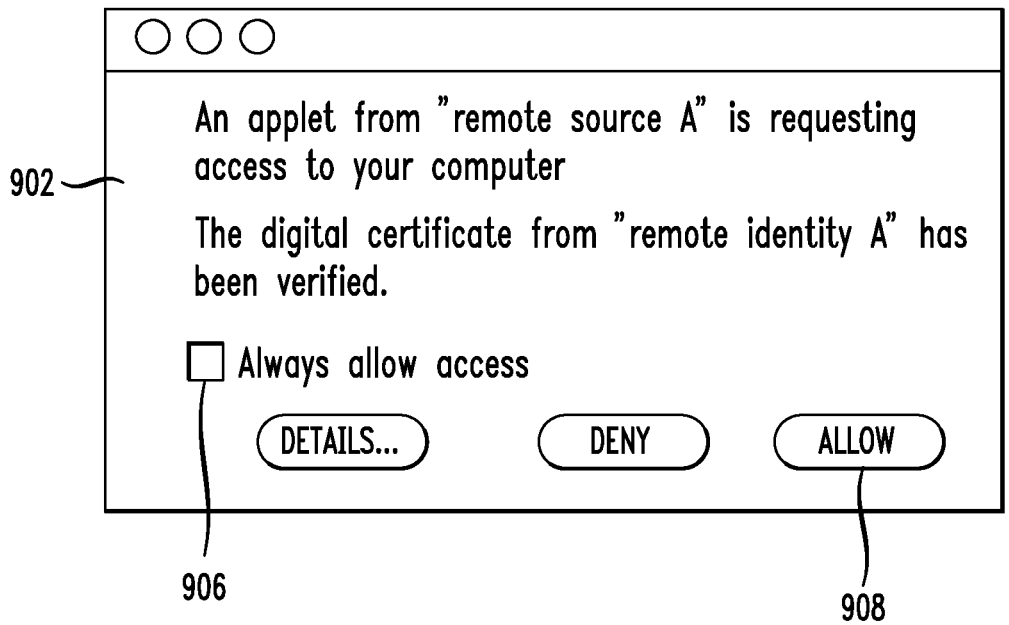
FIG. 9 illustrates a pair of exemplary access request dialog boxes.
Figure 9:
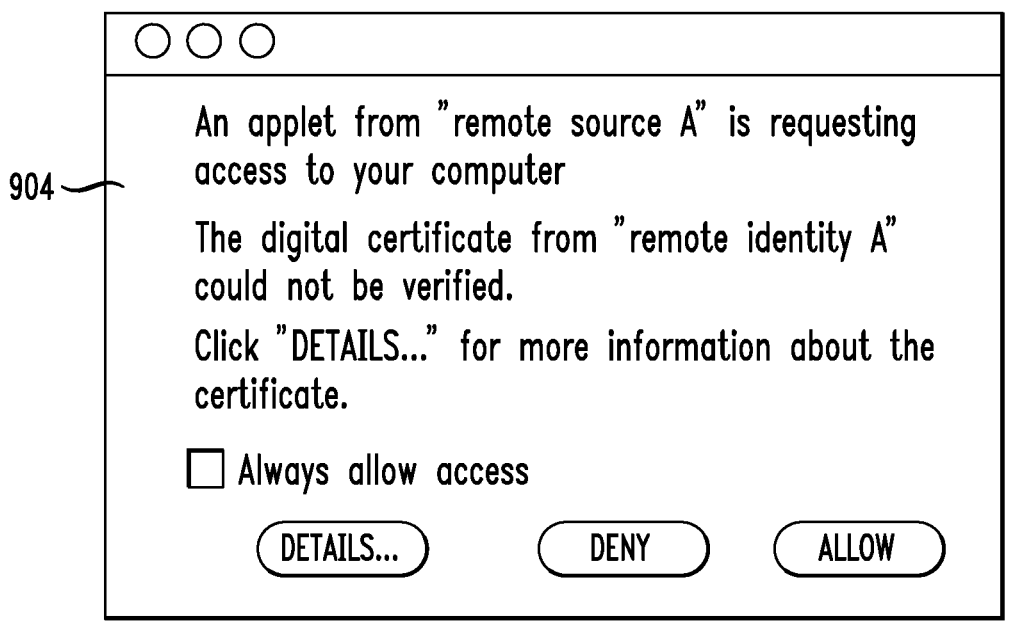

Prior to issuing a request to grant access, the system 702 verifies the digital certificate of applet 708. The result from the digital certificate verification is included in the request to grant access dialog box so that the user can make an informed decision. FIG. 9 illustrates two possible dialog boxes based on two different certificate verification results. The system 702 presents dialog box 902 to request access when certificate verification succeeds. In contrast, dialog box 904 notifies the user that certificate verification failed, but still allows the user to grant access for applet 708. Since the user plans to frequently post photos using applet 708, the user checks the "Always allow access" box 906 and clicks the "Allow" button 908. The system 702 updates lookup table 802 by adding the key and value to the table producing lookup table 804. Additionally, the system 702 allows applet 708 access to the system's hard drive 702*a*.

Figure 10:
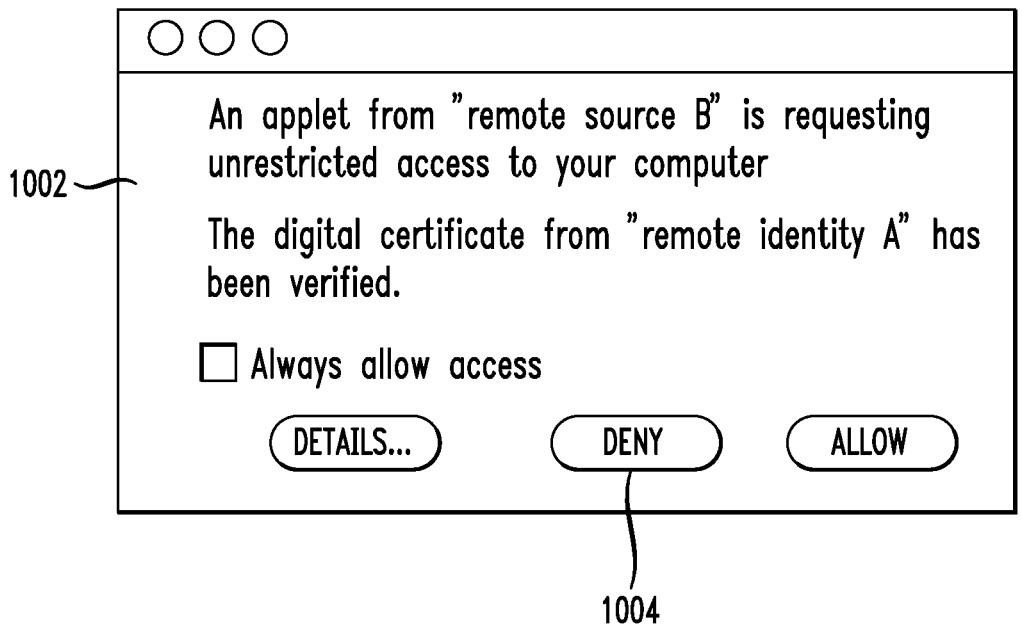
FIG. 10 illustrates an exemplary access request dialog box where the digital certificate does not match the originating source.

At some later date, the user again decides to post some new photos and navigates to what the user thinks is the same photo uploader applet. Unfortunately, the user has navigated to a malicious remote source 706 with identity RSb, which has stolen or copied the applet from remote source 704 and either modified the applet or how the applet is used for malicious purposes. The system 702 downloads applet 712 from remote source 706. Because applet 712 was originally obtained from remote source 704, it has the same identity A and cryptographic identity IDa as applet 708. When the system 702 executes the applet 712, the applet 712 attempts to access the system's hard drive 702a. This access attempt again triggers the system's access control mechanism 702b. The system 702 constructs a key using the applet's cryptographic identity and the identity of the remote source, i.e. key=(IDa, RSb), and uses the key to access the lookup table 804. Despite the fact that the cryptographic identity of the applet 712 is the same as the cryptographic identity of applet 708, the lookup fails due to the differing remote sources. The lookup failure triggers the system 702 to again present the user with a dialog box requesting access. The dialog box 1002 in FIG. 10, notifies the user that the applet 712 was obtained from remote source B, but the digital certificate is from remote source A. Based on this information, the user is skeptical of the applet 712 and therefore clicks the "Deny" button 1004. Because the user denied the applet 712, the system 702 does not add the key or access value to lookup table 804. Additionally, the system denies applet 712 from accessing the system's hard drive 702a. Had the access verification been based strictly on the cryptographic identity, the system 702 would have granted applet 712 access to the hard drive 702a, creating a potential security risk.

Upon realizing the navigation error, the user properly navigates to remote source 704 to post the photos. Because some time has passed since the user last visited the site, the social networking site has made improvements to their photo uploading applet. Now instead of downloading applet 708, the system 702 downloads applet 710, which now has identity A' and cryptographic identity IDa'. When the system 702 executes applet 710, the applet 710 attempts to access the system's hard drive 702a. This access attempt again triggers the system's access control mechanism 702b. The system 702 constructs a key using the applet's cryptographic identity and the identity of the remote source, i.e. key=(IDa', RSa), and uses the key to access the lookup table 804. Despite the fact that the remote source 704 is the same as the remote source for applet 708, the cryptographic identity of the applet 710 differs from applet 708. This causes a lookup failure so the system 702 again presents the user with a dialog box requesting access. This new dialog box either directly or indirectly alerts the user that the applet 710 differs from the previously used applet 708. Since the user is comfortable with the applet 710, the user again checks the "Always allow access" box 906 and clicks the "Allow" button 908. The system 702 updates lookup table 804 to produce lookup table 806 and allows the applet 710. Now later in the day when the user posts photos using the applet 710 from remote source 704, the user can do so without the system 702 requesting access.

FIG. 7 can also be used to illustrate a second usage scenario of the disclosed method. The user purchases a video from an online video retailer. In order to watch the video for the first time the system 702 downloads the video A with cryptographic identity IDa (708) from the remote source 704. When the system 702 begins to play the video 708, the system's access control mechanism 702b is triggered. Because this is the first attempt to play the video 708, the system 702 has no prior record of user approval so it issues a request to grant access. The user, who wishes to watch the video 708, grants access. Furthermore, the user indicates that all future usage of the video 708 should be permitted without seeking permission. The system 702 stores the approval of video 708.

After watching the video, the user realizes that the video collection is occupying a significant amount of storage space on the system 702 that the user would like to use for something else. The online video retailer from which the user purchases videos offers the ability to maintain a copy of the user's digital video library on their servers. This allows the user to delete the local copy of video 708 and re-download it when the user wishes to view the video. Because of the online digital library, the user deletes the original copy of video 708. At some later date, the user wishes to watch video A again. This time when the system 702 downloads the video A with cryptographic identity IDa it is directed to remote source 706, which is responsible for maintaining the digital libraries. When the system downloads video A it gets object 712 instead of 708. The attempt to watch the video again triggers the access control mechanism 702b. Despite the fact that the cryptographic identity of the video 712 is the same as the cryptographic identity of 708, the verification fails due to the differing remote sources. The user is thus, once again presented with a request to grant access. The user grants access to this and all future accesses of the video 712. The system stores the approval. As long as the video retailer continues the practice of using remote source 706 to handle requests for the digital libraries, even if the user deletes 712, any future download and playback of the video A with cryptographic identity IDa will be permitted without a request from the user.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method for securing a manner in which objects are accessed by a computing device, the method comprising:
at the computing device:
receiving a first object from a first remote source, wherein the first remote source is associated with at least one first property and a first cryptographic identity;
generating a first security key based on the first object, the at least one first property, and the first cryptographic identity;
upon identifying that the first object is not known to the computing device:
identifying a first access level to be granted to the first object,
encrypting the first access level based on at least one of the first object, the at least one first property, and the first cryptographic identity, to produce an encrypted first access level,
associating the first security key with the encrypted first access level, and
granting the first access level to the first object; and
subsequent to granting the first access level to the first object:
receiving a second object from a second remote source, wherein second remote source is associated with at least one second property and a second cryptographic identity;
generating a second security key based on the second object, the at least one second property, and the second cryptographic identity;
when the second security key matches the first security key:
identifying the first access level in accordance with the encrypted first access level associated with the first security key, and
granting the first access level to the second object; and
when the second security key does not match the first security key:
identifying a second access level to be granted to the second object.

2. The method of claim 1, wherein the second security key matches the first security key when:
the first object, the first remote source, the at least one first property, and the first cryptographic identity, when compared to the second object, the second remote source, the at least one second property, and the second cryptographic identity, respectively, satisfy a threshold degree of similarity.

3. The method of claim 1, wherein one or more of the first object and the second object comprises a set of executable instructions.

4. The method of claim 1, wherein at least one of the first cryptographic identity and the second cryptographic identity comprises a digital certificate that is digitally signed by one or more signing authorities.

5. The method of claim 1, wherein identifying the first access level to be granted to the first object comprises:
presenting, via a user interface and to a user, a plurality of access levels associated with the first object, wherein the plurality of access levels includes the first access level, and
receiving, via the user interface and from the user, a selected access level from the plurality of access levels, wherein the selected access level corresponds to first access level.

6. The method of claim 5, wherein the user interface enables the user to review information associated with one or more of the at least one first property and the first cryptographic identity associated with the first remote source.

7. The method of claim 1, wherein, when the second security key does not match the first security key, the method further comprises:
presenting, via a user interface and to a user, a plurality of access levels associated with the second object, wherein the plurality of access levels includes an access level that, when selected by the user, causes the computing device to disable functionality associated with the second object.

8. A non-transitory computer readable storage medium configured to store instructions that, when executed by a processor included in a computing device, cause the computing device to secure a manner in which objects are accessed by a computing device, by carrying out steps that include:
receiving a first object from a first remote source, wherein the first remote source is associated with at least one first property and a first cryptographic identity;
generating a first security key based on the first object, the at least one first property, and the first cryptographic identity;
upon identifying that the first object is not known to the computing device:
identifying a first access level to be granted to the first object,
encrypting the first access level based on at least one of the first object, the at least one first property, and the first cryptographic identity, to produce an encrypted first access level,
associating the first security key with the encrypted first access level, and
granting the first access level to the first object; and
subsequent to granting the first access level to the first object:
receiving a second object from a second remote source, wherein second remote source is associated with at least one second property and a second cryptographic identity;
generating a second security key based on the second object, the at least one second property, and the second cryptographic identity;
when the second security key matches the first security key:
identifying the first access level in accordance with the encrypted first access level associated with the first security key, and
granting the first access level to the second object; and when the second security key does not match the first security key:
  identifying a second access level to be granted to the second object.

9. The non-transitory computer readable storage medium of claim 8, wherein the second security key matches the first security key when:
the first object, the first remote source, the at least one first property, and the first cryptographic identity, when compared to the second object, the second remote source, the at least one second property, and the second cryptographic identity, respectively, satisfy a threshold degree of similarity.

10. The non-transitory computer readable storage medium of claim 8, wherein one or more of the first object and the second object comprises a set of executable instructions.

11. The non-transitory computer readable storage medium of claim 8, wherein at least one of the first cryptographic identity and the second cryptographic identity comprises a digital certificate that is digitally signed by one or more signing authorities.

12. The non-transitory computer readable storage medium of claim 8, wherein identifying the first access level to be granted to the first object comprises:
presenting, via a user interface and to a user, a plurality of access levels associated with the first object, wherein the plurality of access levels includes the first access level, and
receiving, via the user interface and from the user, a selected access level from the plurality of access levels, wherein the selected access level corresponds to first access level.

13. The non-transitory computer readable storage medium of claim 12, wherein the user interface enables the user to review information associated with one or more of the at least one first property and the first cryptographic identity associated with the first remote source.

14. The non-transitory computer readable storage medium of claim 8, wherein, when the second security key does not match the first security key, the steps further include:
presenting, via a user interface and to a user, a plurality of access levels associated with the second object, wherein the plurality of access levels includes an access level that, when selected by the user, causes the computing device to disable functionality associated with the second object.

15. A computing device configured to secure a manner in which objects are accessed by the computing device, the computing device comprising:
a hardware processor, wherein the hardware processor is configured to cause the computing device to carry out steps that include:
receiving a first object from a first remote source, wherein the first remote source is associated with at least one first property and a first cryptographic identity;
generating a first security key based on the first object, the at least one first property, and the first cryptographic identity;
upon identifying that the first object is not known to the computing device:
identifying a first access level to be granted to the first object,
encrypting the first access level based on at least one of the first object, the at least one first property, and the first cryptographic identity, to produce an encrypted first access level,
associating the first security key with the encrypted first access level, and
granting the first access level to the first object; and
subsequent to granting the first access level to the first object:
receiving a second object from a second remote source, wherein second remote source is associated with at least one second property and a second cryptographic identity;
generating a second security key based on the second object, the at least one second property, and the second cryptographic identity;
when the second security key matches the first security key:
identifying the first access level in accordance with the encrypted first access level associated with the first security key, and
granting the first access level to the second object; and
when the second security key does not match the first security key:
identifying a second access level to be granted to the second object.

16. The computing device of claim 15, wherein the second security key matches the first security key when:
the first object, the first remote source, the at least one first property, and the first cryptographic identity, when compared to the second object, the second remote source, the at least one second property, and the second cryptographic identity, respectively, satisfy a threshold degree of similarity.

17. The computing device of claim 15, wherein one or more of the first object and the second object comprises a set of executable instructions.

18. The computing device of claim 15, wherein at least one of the first cryptographic identity and the second cryptographic identity comprises a digital certificate that is digitally signed by one or more signing authorities.

19. The computing device of claim 15, wherein identifying the first access level to be granted to the first object comprises:
presenting, via a user interface and to a user, a plurality of access levels associated with the first object, wherein the plurality of access levels includes the first access level, and
receiving, via the user interface and from the user, a selected access level from the plurality of access levels, wherein the selected access level corresponds to first access level.

20. The computing device of claim 19, wherein the user interface enables the user to review information associated with one or more of the at least one first property and the first cryptographic identity associated with the first remote source.

* * * * *